United States Patent
Mavridis et al.

(10) Patent No.: US 11,100,902 B2
(45) Date of Patent: Aug. 24, 2021

(54) IMAGE DISPLAY USING ROTATED FRAME OF REFERENCE

(71) Applicant: Microsoft Technology Licensing, LLC, Redmond, WA (US)

(72) Inventors: Pavlos Mavridis, Reutlingen (DE); Dag Birger Frommhold, Metzingen (DE); Adam Andrzej Cichocki, Reutlingen (DE)

(73) Assignee: Microsoft Technology Licensing, LLC, Redmond, WA (US)

(*) Notice: Subject to any disclaimer, the term of this patent is extended or adjusted under 35 U.S.C. 154(b) by 5 days.

(21) Appl. No.: 16/388,399

(22) Filed: Apr. 18, 2019

(65) Prior Publication Data

US 2020/0335067 A1 Oct. 22, 2020

(51) Int. Cl.
*G09G 5/38* (2006.01)
*G06T 3/60* (2006.01)
*G06T 19/00* (2011.01)

(52) U.S. Cl.
CPC ............. *G09G 5/38* (2013.01); *G06T 3/60* (2013.01); *G06T 19/006* (2013.01); *G09G 2320/0247* (2013.01); *G09G 2340/0492* (2013.01)

(58) Field of Classification Search
CPC .......... G06F 3/012; G06F 3/011; G06F 3/013; G06F 3/0346; G06F 3/04815; G02B 27/017; G02B 2027/0187; G02B 27/0093; G02B 2027/0138; G02B 2027/014; G02B 27/0179; G02B 2027/0198; G06T 19/20;
(Continued)

(56) References Cited

U.S. PATENT DOCUMENTS

2018/0307310 A1* 10/2018 McCombe .............. G06F 3/013
2020/0018965 A1* 1/2020 Milner-Moore ........ G06T 11/40
2020/0228788 A1* 7/2020 Selan ................. G02B 27/0176

FOREIGN PATENT DOCUMENTS

EP 3382651 A1 10/2018
JP H08542 A 1/1996
(Continued)

OTHER PUBLICATIONS

Beets, et al., "Super-sampling Anti-aliasing Analyzed", In Whitepaper of Beyond 3D, Retrieved on: Mar. 6, 2019, 22 Pages.
(Continued)

*Primary Examiner* — Xiao M Wu
*Assistant Examiner* — Scott E Sonners
(74) *Attorney, Agent, or Firm* — Alleman Hall Creasman & Tuttle LLP

(57) ABSTRACT

Examples are disclosed that relate to computing devices, head-mounted display (HMD) devices, and methods for displaying an image via a display device. In one example, a method for displaying an image via a display device comprises receiving an original frame of reference, determining a rotated device orientation of the display device, and modifying the original frame of reference to a rotated frame of reference based on the rotated device orientation. The method further comprises sampling data describing a virtual world at the rotated frame of reference to produce an intermediate image frame, generating a final image frame by back-rotating the intermediate image frame to the original frame of reference, and displaying the final image frame via the display device.

20 Claims, 10 Drawing Sheets

(58) Field of Classification Search
CPC ..... G06T 2219/2004; G06T 2219/2016; G06T 3/0093; G06T 19/006; G06T 19/00; G06T 19/003; G06T 2207/10016; G06T 3/60; G06T 15/20; G06T 2200/04; G09G 2340/0478; G09G 2320/0261; H04N 13/344; H04N 13/279; H04N 13/366; H04N 13/383; H04N 5/23238; H04N 13/282; G06K 9/00671
See application file for complete search history.

(56) References Cited

FOREIGN PATENT DOCUMENTS

| WO | 9603715 A1 | 2/1996 |
|----|------------|--------|
| WO | 2018158555 A1 | 9/2018 |

OTHER PUBLICATIONS

"International Search Report and Written Opinion Issued in PCT Application No. PCT/US2020/023046", dated Jun. 23, 2020, 11 Pages.

* cited by examiner

IMAGE DISPLAY USING ROTATED FRAME OF REFERENCE

BACKGROUND

Virtual and augmented reality devices enable users to view images of detailed virtual worlds. To generate and display images of a virtual world, a device may sample data describing the virtual world at a plurality of sampling positions. In some examples, this may result in visual artifacts, such as temporal aliasing or flickering pixels.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to computing devices, head-mounted display (HMD) devices, and methods for displaying an image via a display device. In one example, a method for displaying an image via a display device comprises receiving an original frame of reference, determining a rotated device orientation of the display device, and modifying the original frame of reference to a rotated frame of reference based on the rotated device orientation. The method further comprises sampling data describing a virtual world at the rotated frame of reference to produce an intermediate image frame, generating a final image frame by back-rotating the intermediate image frame to the original frame of reference, and displaying the final image frame via the display device.

DETAILED DESCRIPTION

Virtual reality (VR) and augmented reality (AR) devices, including head-mounted display (HMD) devices, enable users to view images of detailed virtual worlds. Such devices may implement various methods in a graphics pipeline to generate and display such images of a virtual world. The graphics pipeline begins with creation of a 3D model of the virtual world, for instance in a video game or any other suitable VR or AR application. The graphics pipeline may also include processing methods such as collision detection, animation, morphing, and acceleration techniques, often bundled into a single application step that precedes image synthesis.

To generate the image, a virtual camera may be defined to indicate a position and direction of view for the image. The position and orientation of the virtual camera define a camera coordinate system. One or more transformation steps may be used to map objects from the camera coordinate system into a clip coordinate system and a screen coordinate system. The data describing the virtual image may then be rasterized and shaded. In some examples, a pixel shader is run to mix colors of each visible pixel with existing color values in the image, which may include using transparency or multi-sampling.

Figure 1:
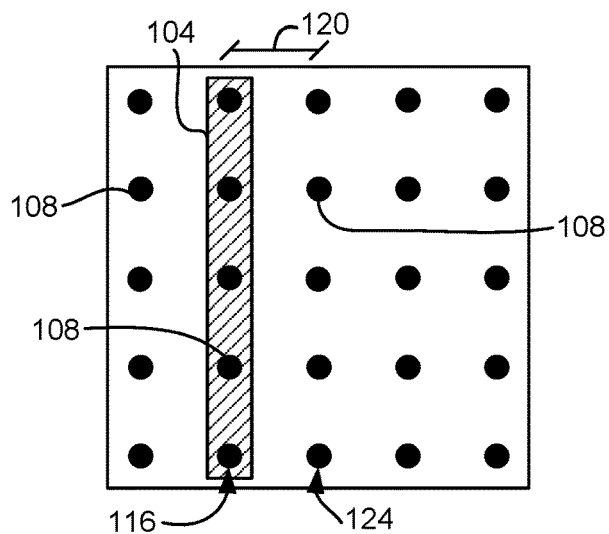
FIG. 1 shows an example of a small virtual object in a virtual world and a plurality of sampling positions used to generate an image.
Figure 2:
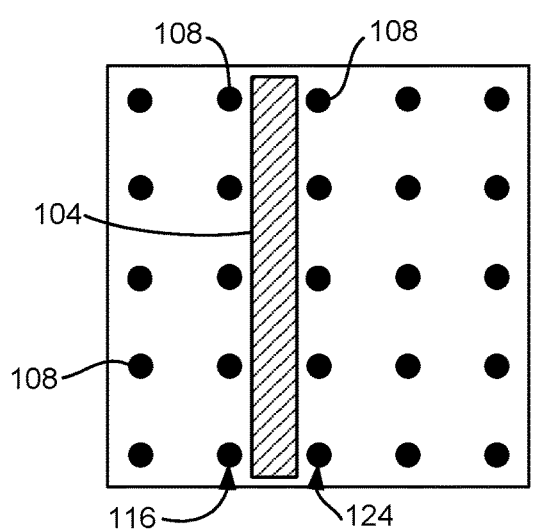
FIG. 2 shows an example of the virtual object of FIG. 1 positioned between sampling positions.
Figure 3:
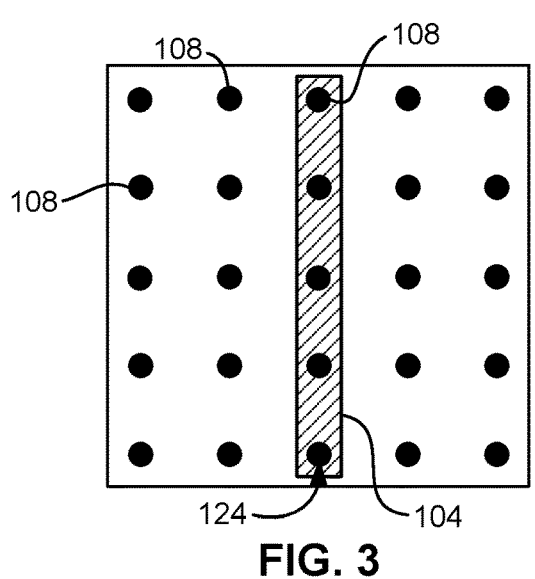
FIG. 3 shows an example of the virtual object of FIG. 2 aligned with sampling positions.

In some examples, temporal and/or spatial aliasing may occur when thin image features are aligned with pixel sampling positions. With reference now to FIG. 1, one example is illustrated depicting a thin virtual object 104 comprising a very small portion of a virtual world. As illustrated in FIG. 1, the thin virtual object 104 may be generated by sampling the virtual world at a plurality of sampling positions 108, each of which may correspond to a position within a pixel of a display device. As such, the plurality of sampling positions 108 may comprise a repeating geometric pattern, such as a regular grid, as depicted in FIGS. 1-4.

Each of the plurality of sampling positions 108 may be defined in an offscreen buffer. Images may be generated in the offscreen buffer by sampling each of the sampling positions 108 to determine a shading value for each pixel of the display. In the example of FIG. 1, the virtual object 104 overlaps a first column 116 of sampling positions 108. Accordingly, the virtual object 104 may be rasterized and made visible in the resulting image of the virtual world.

Depending on a pixel density of the display device, in some cases small virtual objects, or small features of larger virtual objects, may fall between sampling positions. Even on a high-resolution HMD device, with a pixel density such as 1600×1400 and a field of view of 100 degrees, thin image features may fall between pixels.

For example, the virtual object 104 depicted in FIG. 1 is narrower than a gap 120 between the first column 116 of sampling positions 108 and a second column 124 of sampling positions 108. Accordingly, in some examples the virtual object 104 may move to a different position where it may not overlap any of the sampling positions 108. For example, in FIG. 2 the virtual object 104 is now positioned between the first column 116 and the second column 124 of sampling positions 108, such that it does not overlap with any of the sampling positions. Accordingly, as the virtual object 104 moves from the configuration of FIG. 1 to the configuration of FIG. 2, it may disappear from the displayed image.

When the virtual object 104 moves into a position where it again overlaps with one or more of the sampling positions 108, the virtual object 104 will reappear in the image. For example, in FIG. 3 the virtual object 104 is now aligned with and overlaps the second column 124 of sampling positions 108. Accordingly, as the virtual object 104 moves from the configuration of FIG. 2 to the configuration of FIG. 3, it is rasterized and reappears in the image.

In these situations, temporal aliasing may occur, which may manifest as a flickering effect in which the virtual object 104 appears and disappears to the viewer. In some examples, spatial aliasing artifacts, such as jagged edges, also may be experienced. These effects may be particularly pronounced when displaying highly detailed content that contains features that are thinner than the spacing between sampling positions. Such effects are further magnified when the detailed content is in the form of buildings, furniture, and other man-made objects in which prominent features include straight horizontal and vertical lines that often align with the pixels of the display device. Additionally, these effects may be exaggerated when viewing the image via a head-mounted display (HMD) or similar type of device that moves frequently.

To address these issues, many devices and applications simply avoid displaying highly detailed content. In other examples, some devices may use super-sample anti-aliasing (SSAA) to take multiple samples for every pixel. However, super-sampling is computationally expensive and may be prohibitive for real-time applications such as VII and AR, where minimal latency is desirable.

In some examples, multi-sample anti-aliasing (MSAA) may make super-sampling more efficient by taking multiple samples to determine only the coverage of a pixel and by performing shading only one time per pixel. In MSAA the samples used to determine pixel coverage may be rotated to improve the effectiveness of anti-aliasing. However, the sampling positions for shading are not rotated. Therefore, MSAA is more effective in addressing aliasing of geometric edges than addressing aliasing from shading (like specular aliasing).

In some examples, temporal anti-aliasing (TAA) may mitigate some issues associated with geometric and shading aliasing by reusing samples over multiple frames in time. However, this approach may not substantially reduce flickering and other aliasing artifacts when displaying highly detailed images with thin features via HMD devices.

Figure 4:
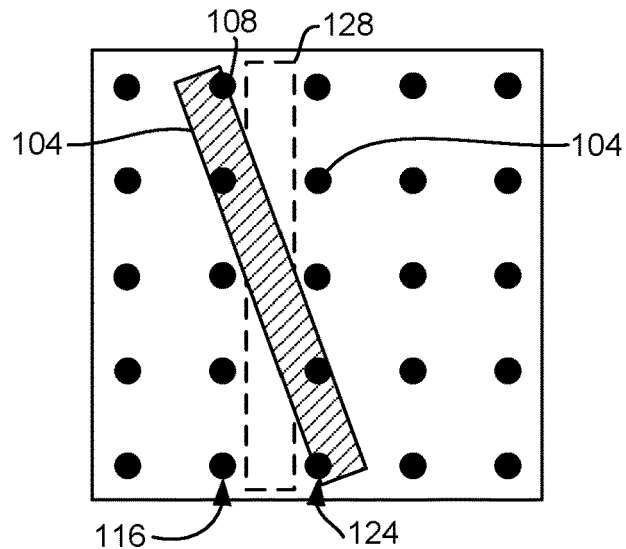
FIG. 4 illustrates an example of sampling a rotated representation of the virtual object.

One approach to at least partially address aliasing issues is by performing coverage or shading operations on a rotated representation of data describing a virtual world. For example and with reference now to FIG. 4, data describing a virtual world including the virtual object 104 depicted in FIG. 2 may be rotated away from its original orientation 128. As shown in FIG. 4, although the virtual object 104 is rotated, the orientation and arrangement of the sampling positions 108 remain unchanged. Now, rather than being positioned in between sampling positions 108, the virtual object 104 overlaps several sampling positions 108. In this manner, as the virtual object 104 moves relative to the sampling positions 108, it may not disappear completely, resulting in a more stable image. Further, as the virtual object 104 overlaps at least one sampling position 108 in the first column 116 and at least one sampling position 108 in the second column 124, sampling this rotated representation of the virtual object may also contribute to preventing issues related to spatial aliasing.

Figure 5:
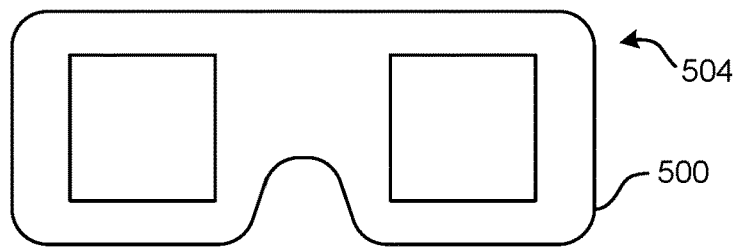
FIG. 5 schematically illustrates an example of a head-mounted display (HMD) device.
Figure 6:
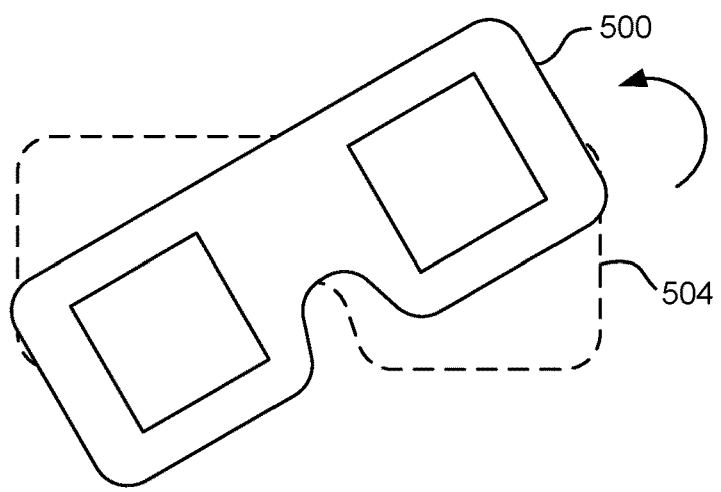
FIG. 6 shows the example HMD device of FIG. 5 rotated away from its initial orientation.

However, when using this approach to display content via an HMD device, or other such devices that are moveable, the device may be rotated or tilted such that the screen of the device becomes re-aligned with the rotated representation of the virtual object. For example, FIGS. 5 and 6 illustrate one such example of an HMD device 500. In FIG. 5 the HMD device 500 has an initial orientation 504 in which a user may begin viewing VR content.

In some examples, as depicted in FIG. 6, the HMD device 500 may be rotated away from its initial orientation 504. For example, the user may tilt his or her head while wearing the HMD device. In such examples, when the HMD device 500 is rotated away from its initial orientation 504 by an angle in phase with the rotation of the virtual object, alignment may be undesirably restored. As described above, such alignment may cause flickering and other artifacts in images displayed via the HMD device.

Accordingly, and as described in more detail below, the present disclosure presents methods and techniques for displaying images in which an original frame of reference may be adaptively rotated based on the orientation of the display device. In this manner, a rotation angle for the frame of reference may be changed to compensate for any rotation of the display device. Accordingly, and in one potential advantage of the present disclosure, temporal aliasing and other artifacts may be eliminated or substantially reduced. Even when displaying highly detailed content, methods of the present disclosure may allow the display of temporally stable images on display devices with limited pixel densities.

Figure 7:
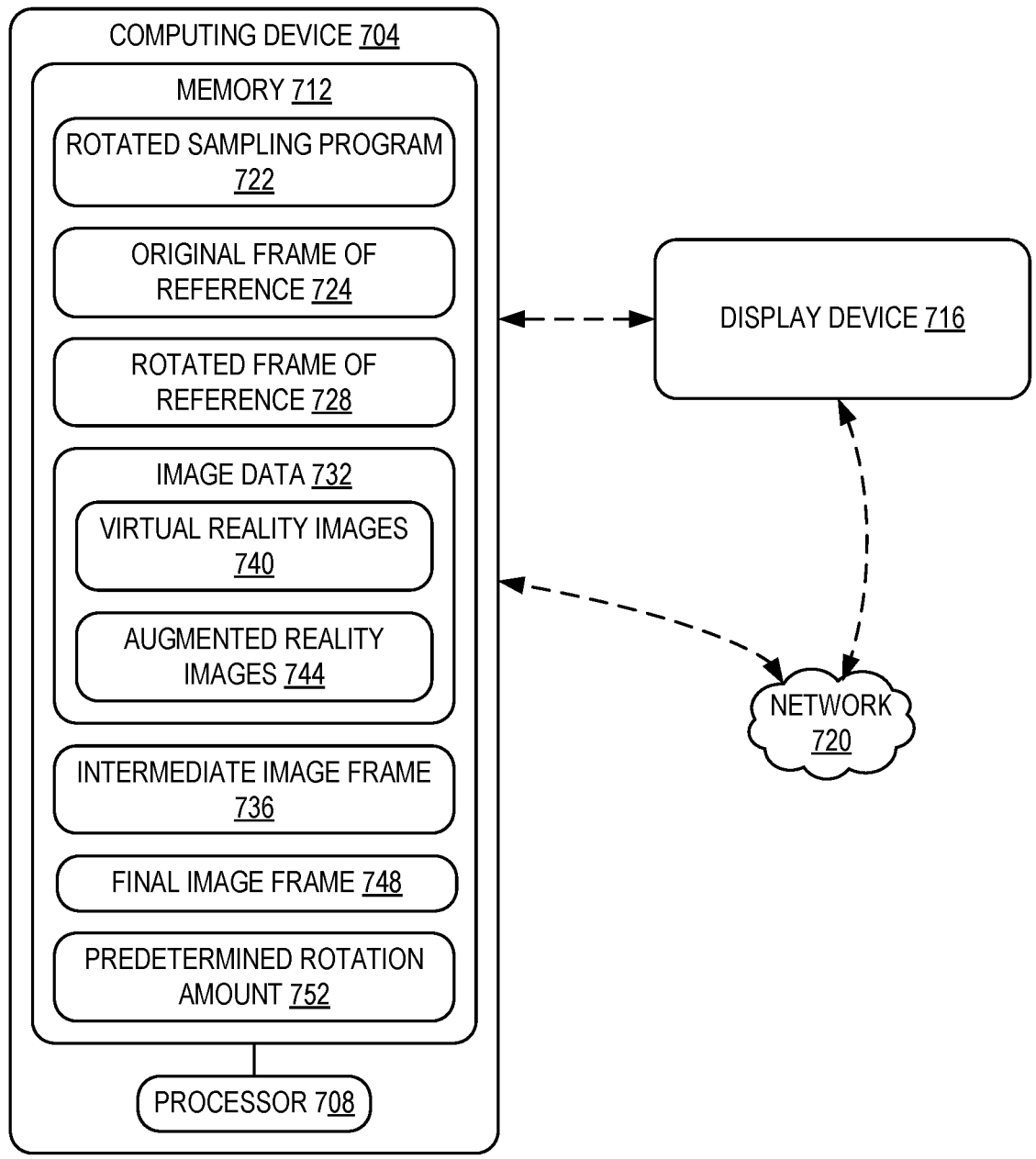
FIG. 7 shows a block diagram illustrating an example system for displaying an image via a display device according to examples of the present disclosure.

FIG. 7 schematically illustrates an example of a computing device 704 that may utilize adaptive rotation to effect anti-aliasing according to the present disclosure. Computing device 704 may comprise a processor 708 and a memory 712 storing instructions executable by the processor to display an image via a display device 716. In some examples, the computing device 704 may be integrated with the display device 716 in a common enclosure, such as in an HMD device. In other examples, the computing device 704 may be a separate unit communicatively coupled with the display device 716, either directly via a wired connection or indirectly via a network 720 such as the Internet. For example, the computing device 704 may comprise a desktop computer, a game console, or a server. Additional details regarding the components and computing aspects of the computing device 704 are described in more detail below with reference to FIG. 15.

As described in more detail in the use case examples discussed below, a rotated sampling program 722 of the computing device 704 receives an original frame of reference 724, such as an original camera coordinate system of a virtual camera. A rotated device orientation of the display device 716 is then determined. Using the rotated device orientation, the rotated sampling program 722 then modifies the original frame of reference 724 to a rotated frame of reference 728, such as by rotating the original camera coordinate system to a rotated camera coordinate system. In some examples, modifying the original frame of reference 724 to the rotated frame of reference 728 comprises modifying a predetermined rotation amount 752 by the rotated device orientation.

The rotated sampling program 722 generates image data 732 using any appropriate sampling technique such as rasterization or raytracing at the rotated frame of reference 728 to produce an intermediate image frame 736. In some examples, the image data 732 comprises virtual reality images 740. In other examples, the image data 732 comprises augmented reality images 744. The computing device 704 then generates a final image frame 748 by back-rotating the intermediate image frame 736 to the original frame of reference 724. The final image frame 748 is then displayed via the display device 716.

Figure 8:
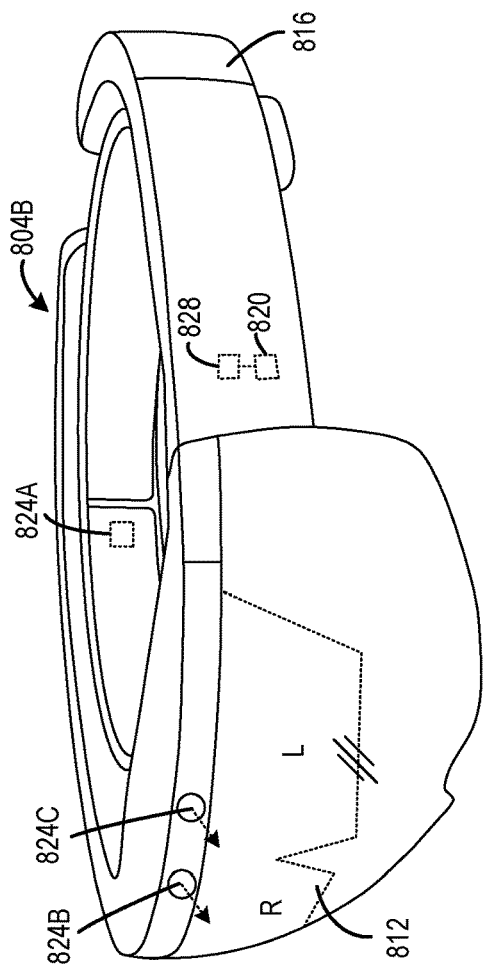
FIG. 8 shows two examples of head-mounted display devices according to examples of the present disclosure.
Figure 8:
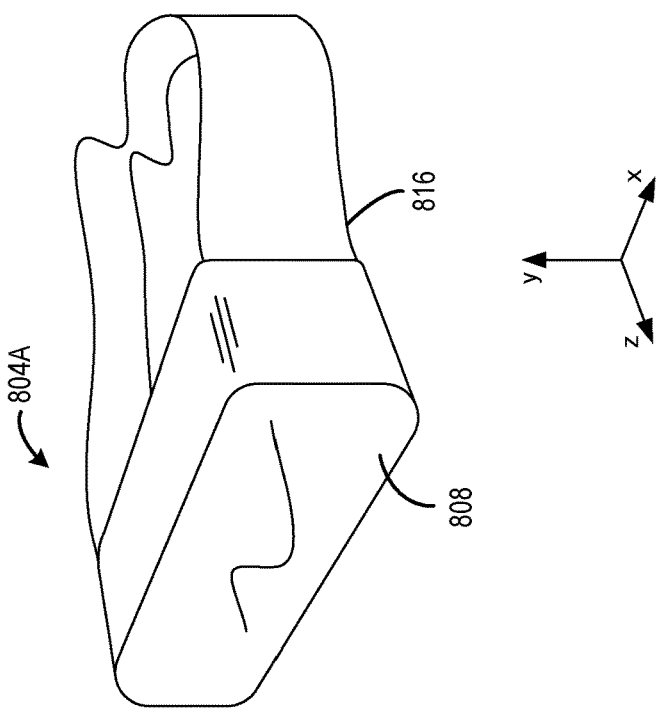

In some examples, aspects of the present disclosure may be practiced by an HMD device. For example, the display device 716 and the computing device 704 may comprise an HMD device. The HMD device may take a variety of forms. As illustrated in FIG. 8, the HMD device may take the form of a virtual reality HMD device 804A that includes an opaque, non-see-through display 808. Another example of an HMD device is an augmented reality HMD device 804B that comprises an at least partially transparent display 812 that is configured to enable a wearer of the augmented reality HMD device to view physical, real-world objects in the physical environment through one or more partially transparent pixels displaying virtual object representations. It will be appreciated that the following descriptions of sensors and systems may apply to both the augmented reality HMD device 804B and the virtual reality HMD device 804A.

In the example of FIG. 8, each of the example HMD devices 804A and 804B has a construction that includes a frame 816 that wraps around the head of a user to position a display close to the user's eyes. The frame of virtual reality HMD device 804A may include a rigid portion and an elastic portion, whereas the frame 816 of augmented reality HMD device 804B may be substantially rigid around its circumference. The frame 816 may support additional components such as, for example, a processor 820 and input devices 824A, 824B, and 824C. The processor 820 includes logic and associated computer memory 828 configured to provide images to a display, to receive sensory signals from input devices 824A, 824B, and 824C, and to enact various control processes and/or other aspects of the methods described herein.

The processor 820 may include a logic processor and the two example HMD devices 804 may include volatile memory and non-volatile storage, as discussed in more detail below with respect to the example computing system 1500 of FIG. 15.

With continued reference to FIG. 8, various suitable display technologies and configurations may be used to display images via the displays of the HMD devices 804A and 804B. For example, in virtual reality (VR) HMD device 804A, the display 808 may be an opaque display, such as a non-see-through Light-Emitting Diode (LED) display, a Liquid Crystal Display (LCD), or any other suitable type of opaque or otherwise non-see-through display. In augmented reality (AR) HMD device 804B, the display 812 may include image-producing elements such as, for example, a see-through Organic Light-Emitting Diode (OLED) display, or a liquid crystal on silicon (LCOS) display. In other examples, the AR HMD device 804B may include a light modulator on an edge of the display 812. In this example, the display 812 may serve as a light guide for delivering light from the light modulator to the eyes of a wearer.

The VR display 808 and AR display 812 may include both a left L and right R display in a stereoscopic display configuration. The left L and right R displays each display a view of an augmented reality scene from the perspective of the user's corresponding eye. By viewing the augmented reality scene through the left L and right R displays, the user will perceive virtual objects as being located at particular depths in the real world.

The input devices 824A, 824B, and 824C may include various sensors and related systems to provide information to the processor 820. Such sensors may include an inertial measurement unit (IMU) 824A, one or more image sensors 824B, and one or more ambient light sensors 824C. The one or more outward facing image sensors 824B may be configured to capture and/or measure physical environment attributes of the physical environment in which the augmented reality HMD device 804B is located. In one example, the one or more image sensors 824B may include a visible-light camera configured to collect a visible-light image of a physical space.

In both the AR HMD device 804B and VR HMD device 804A, the position and/or orientation of the device relative to the physical environment may be assessed. In different examples, signals from the IMU 824A, the one or more image sensors 824B, and/or the one or more ambient light sensors 824C may be utilized to provide position and/or orientation data to the processor 820. The position and/or orientation derived from the sensor signals may be used to indicate a rotated device orientation of the HMD device. In this manner, and as described in more detail below, a tilted/rotated orientation of the device relative to the environment may be utilized in the rotated sampling algorithm of the present disclosure to generate a temporally-stable final image for display. The position and/or orientation of the device also may be utilized to display one or more images with a realistic and stable position and orientation.

In the disclosed examples, one or more cameras on the HMD device, and/or one or more external imaging systems, such as cameras mounted in a surrounding environment, may be used to visually track a pose of the HMD device. Additionally, one or more sensors, such as an IMU that may include an accelerometer, gyroscope, magnetometer, and/or other suitable sensors, may provide output related to changes in a pose of the HMD device.

The "pose" of the HMD device may refer to its orientation in three degrees of freedom (3DoF) or its orientation and position in six degrees of freedom (6DoF) within a three-dimensional environment. With 3DoF tracking, the orientation of the HMD device is tracked by monitoring rotation around the X, Y, and Z axes, or pitch, yaw, and tilt. In 3DoF tracking, the position and translation of the device along the X, Y, and Z axes are not tracked.

In one example, an HMD device may comprise an IMU configured as a three-axis or 3DoF position sensor system. This example position sensor system may, for example, include three gyroscopes to indicate or measure a change in orientation of the HMD device within three-dimensional space about an X, Y, and Z axis. In another example, an HMD device may comprise an IMU configured as a six-axis or 6DoF position sensor system. This example position sensor system may, for example, include three accelerometers and three gyroscopes to indicate or measure a change in location of the HMD device along the three orthogonal axes and a change in the device's orientation about the three axes.

The HMD device may use 3DoF tracking to determine whether a user turns her head left or right (yaw), rotates it up or down (pitch), or tilts it left or right (tilt). Movement along the X, Y, and Z axes may be additionally monitored using 6DoF tracking to determine whether the HMD device moves laterally, vertically, forward, or backward.

Figure 9:
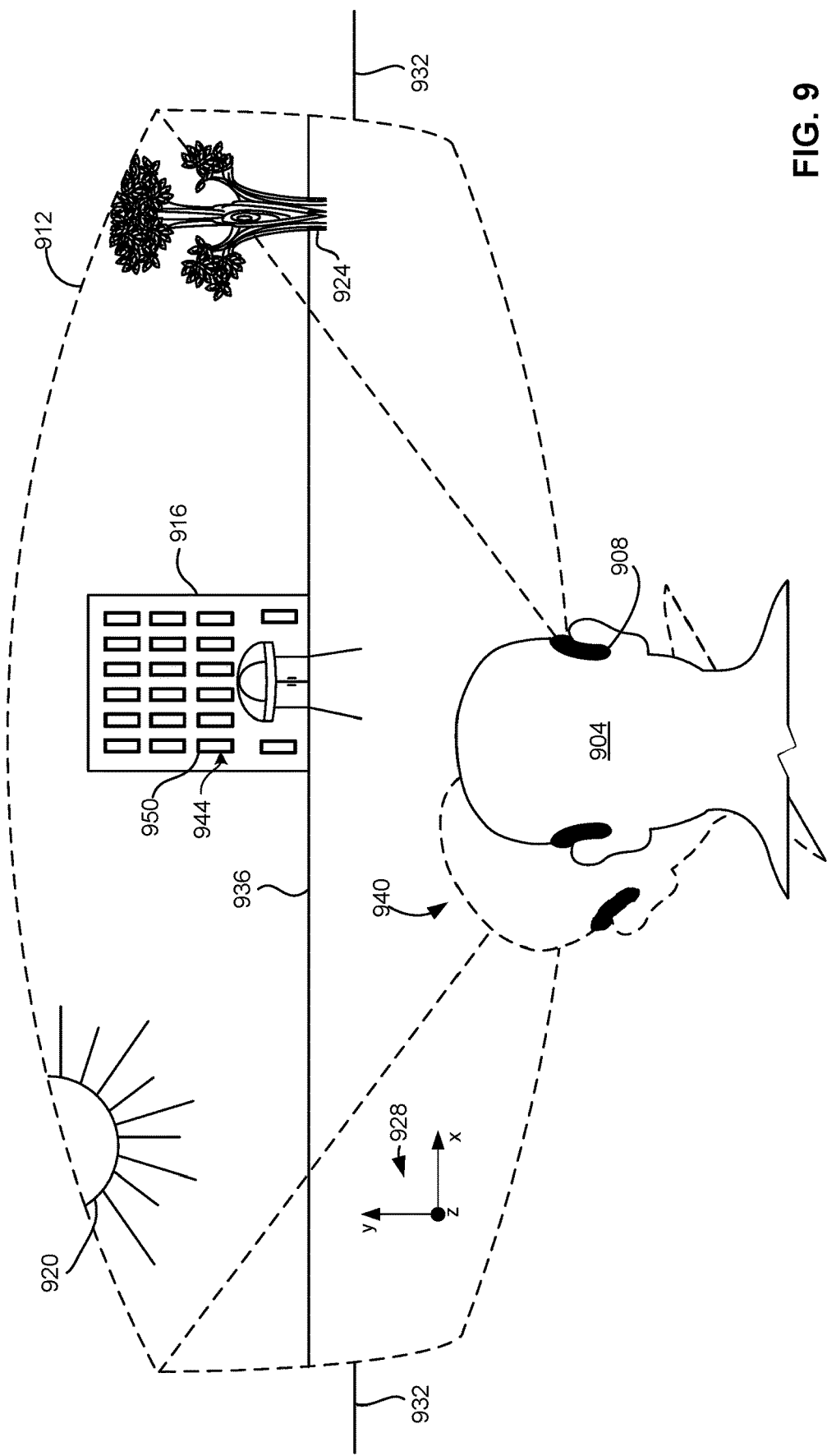
FIG. 9 is an illustrative example of a use case scenario in which a user views virtual reality images according to examples of the present disclosure.

With reference now to FIGS. 9-13, example use cases are provided that illustrate aspects of the present disclosure. In one example and as shown in FIG. 9, a user 904 may view one or more images in a fully immersive, virtual reality world via HMD device 908. The HMD device 908 provides the user 904 with a field of view 912 that includes virtual reality images of a building 916, sun 920, and a tree 924. These images may be world locked within a virtual world coordinate system 928, such that content within the virtual world remains oriented with respect to the virtual world coordinate system 928 regardless of the user's motion or gaze direction. In the present example, the X-axis of the virtual world coordinate system 928 is parallel to a real-world horizon 932 and to a virtual horizon 936.

When the user 904 tilts her head about the z-axis to a rotated position, as indicated at 940, the HMD device 908 may detect its new pose and modify the displayed images to remain oriented to the virtual horizon 936. In this manner, the virtual world coordinate system 928 may be utilized to consistently position virtual objects relative to the virtual world.

Figure 10:
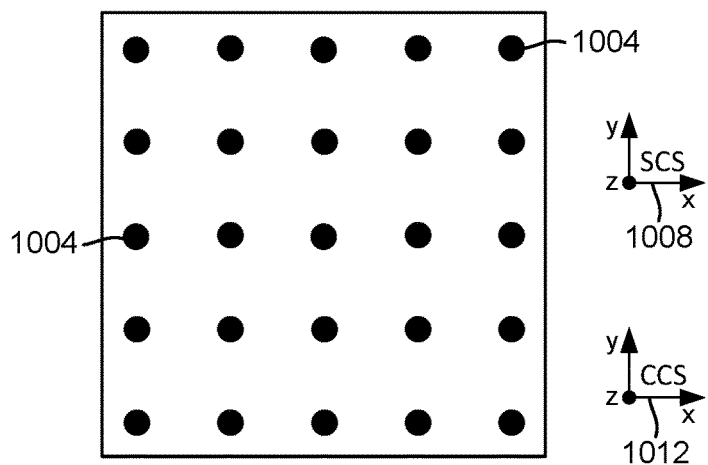
FIG. 10 schematically illustrates a grid of sampling positions according to examples of the present disclosure.
Figure 11:
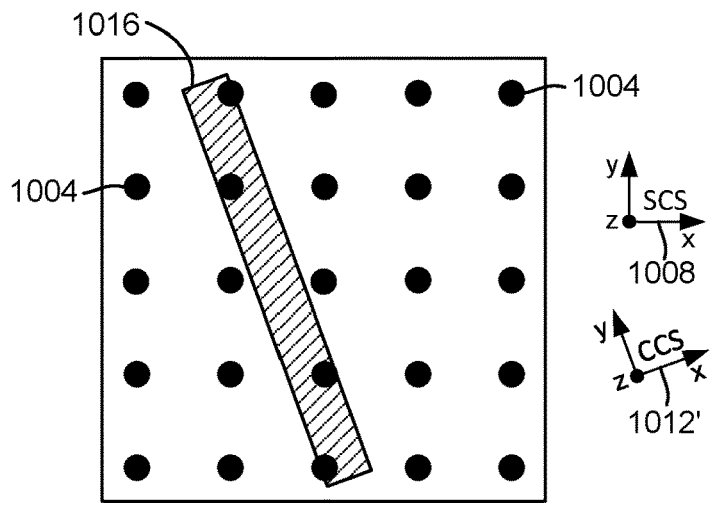
FIG. 11 schematically illustrates a representation of a small virtual object in a rotated frame of reference based on a rotated device orientation according to examples of the present disclosure.
Figure 12:
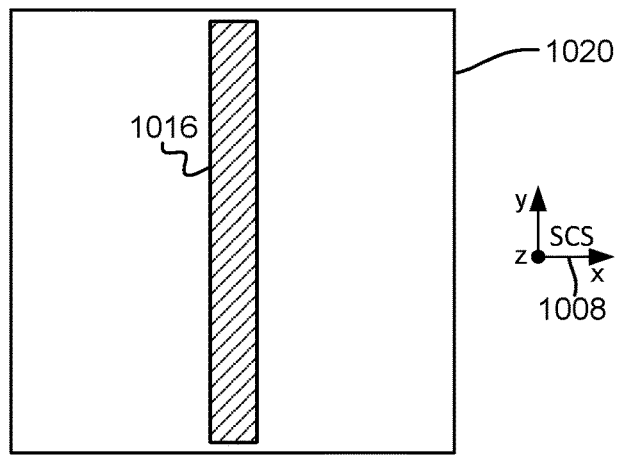
FIG. 12 schematically illustrates a final image frame generated by back-rotating the intermediate image frame of FIG. 11 according to examples of the present disclosure.

The following examples depicted in FIGS. 10-12 schematically illustrate how devices, such as the HMD device 908, may generate images for display using a rotated frame of reference that adaptively accounts for the tilt of the display device to prevent issues related to temporal and spatial aliasing. FIG. 10 schematically illustrates a grid of sampling positions 1004 that may be utilized to generate images for display. It will be appreciated that FIG. 10 illustrates a small portion of the plurality of sampling positions that may be utilized to generate images such as those shown in FIG. 9.

As described above regarding FIGS. 1-4, data describing a virtual world corresponding to the virtual reality environment may be sampled at the sampling positions 1004, with each sampling position 1004 corresponding to a position within a pixel of a display. In this example, the plurality of sampling positions 1004 form a rectangular X-Y grid that aligns with a screen coordinate system (SCS) 1008 of the display. In the example of FIG. 10, the screen coordinate system 1008 is aligned with a camera coordinate system (CCS) 1012 of a virtual camera utilized in the graphics pipeline. As described above, especially with small image features, such alignment may cause flickering and other artifacts in images displayed via the HMD device. Additionally, even when the scene description is rotated by a fixed amount, the user may tilt her head and thereby reintroduce the undesired alignment and/or change the rotational offset to be greater or less than the desired, fixed amount.

Accordingly, and in one potential advantage of the present disclosure, a rotated device orientation of the HMD may be determined and then utilized to modify an original frame of reference to a rotated frame of reference. Data describing the virtual world may then be sampled at the adaptively-rotated frame of reference to prevent the above-described realignment issues. In this manner, the rotated device orientation also may be utilized to provide a rotated frame of reference that matches a desired or predetermined rotation amount.

In one example, and with reference again to FIG. 9, the virtual building 916 may include finely-detailed historical features, such as decorative stucco elements framing the windows of the building. A small vertical feature of one stucco element comprises a virtual object located on a side 944 of window 950. As described in more detail below with reference to FIGS. 11 and 12, in this example the virtual object 1016 comprises a small rectangular shape approximately 5 pixels long. A description of rendering and displaying the virtual object 1016 according to aspects of the present disclosure now follows.

With reference now to the example of FIGS. 10 and 11, an original frame of reference (the camera coordinate system 1012 of FIG. 10) is modified to a rotated frame of reference (the rotated camera coordinate system 1012' of FIG. 11) based on a determined rotated device orientation (described in more detail below). In this example, the camera coordinate system 1012 is rotated counterclockwise relative to the screen coordinate system 1008 to an angle of approximately 22 degrees. In other examples and as described below, other angles of rotation may be utilized. Additionally, in other examples the camera coordinate system 1012 may be rotated clockwise relative to the screen coordinate system 1008.

Accordingly and as depicted in FIG. 11, the virtual object 1016 is aligned with the rotated Y-axis of the rotated camera coordinate system 1012' and is sampled at this rotated frame of reference to produce an intermediate image frame in an offscreen buffer. In this manner, the virtual object 1016 is directly generated in this rotated orientation relative to the screen coordinate system 1008. Accordingly, image features that may have been undesirably aligned with the screen coordinate system may no longer align with the pixels of the screen, thus reducing the potential for aliasing artifacts to affect the displayed image.

A final image frame comprising the virtual object 1016 is then generated and displayed by back-rotating the intermediate image frame to the original frame of reference and re-sampling the intermediate image frame. For example, FIG. 12 illustrates a portion of a final image frame 1020 generated by re-sampling the intermediate rotated representation of the virtual object 1016 in the screen coordinate system 1008. The final image frame may then be displayed via the display device. In this manner, the virtual object 1016 may appear properly oriented to viewers. On HMDs where a re-sampling step is already required to correct lens distortion, this back-rotation can be integrated with the existing lens distortion correction, to reduce computation overhead and quality loss from multiple resampling steps.

As noted above and in one potential advantage of the present disclosure, the angle of rotation of the rotated frame of reference is based on the orientation of the display device. For example, the HMD device 908 of FIG. 9 may monitor its orientation to determine if the user 904 is tilting her head, as indicated at 940. The HMD device 908 may identify an angle at which it is tilted and modify the rotation angle of the frame of reference to compensate for the tilt.

For example, a desired angle of the rotated camera coordinate system 1012' with respect to the original camera coordinate system 1012 may be 25 degrees counterclockwise. However, the user 904 may also be tilting her head and HMD 908 by 25 degrees counterclockwise. Accordingly, the HMD device 908 may utilize its rotated device orientation to compensate for the tilt of the user's head by rotating the camera coordinate system by an additional 25 degrees counterclockwise. In this manner, the HMD device 908 may maintain the desired 25 degrees of offset between the display and the rotated frame of reference.

In some examples, the desired offset for the rotated frame of reference may be predetermined. For example, an offset of between approximately 20 degrees and approximately 30 degrees may eliminate or substantially reduce aliasing artifacts for many types of image content.

In other examples, a suitable offset rotation angle may be determined based on the type of content to be displayed. For example, a rotation angle of 20-22 degrees may substantially reduce or prevent aliasing for objects such as buildings, architecture, furniture, and other objects that feature prominent horizontal and vertical lines. In other examples, prominent features in the image data may be oriented at different angles. For example, the sun 920 and the tree 924 shown in the example of FIG. 9 have more non-linear and angled features than the building 916. When displaying these types of content, aliasing may be more effectively prevented using a different rotation angle.

Accordingly, to reduce or eliminate aliasing artifacts when displaying different types of content, in some examples the frame of reference may be rotated based on the type of content to be displayed in addition to the rotated device orientation. The type of content may be determined via various methods. For example, one or more machine learning and/or statistical analysis algorithms may be used to recognize prominent features in the image data, such as contrasting lines. The orientation of these features may be determined by classifying one or more normal vectors that are perpendicular to each line or surface in a scene. Then, given one or more vantage points, the one or more algorithms may be configured to output a rotation angle for the frame of reference that is based on the contents of the image data.

In other examples, different angles of rotation may be used with the same set of image data. For example, as described above, some devices may include both a left and right display in a stereoscopic display configuration, with each display configured to display one stereoscopic image of a pair of stereoscopic images. In these examples, each of the stereoscopic image frames may be produced using a different angle of rotation for the rotated frame of reference. In this manner, images for each of the user's eyes may be treated differently, enabling stereoscopic displays to adapt to varied use case scenarios and prevent aliasing and other artifacts with a wide variety of content.

In some examples, the image synthesis techniques of the present disclosure may be accommodated by enlarging one or more intermediate buffers. In other examples, optical characteristics of a display may allow efficient implementation of these algorithms without expanding the dimensions of a buffer. For example, optical lenses used to view images in an HMD device may have a circular footprint that is smaller than the images. Thus, some parts of the images, such as the corners of rectangular images, may not be visible outside of the circular footprint. Accordingly, when the footprint of a lens is smaller than the displayed images, rotated image frames may be rendered without expanding the dimensions of an offscreen buffer to accommodate image data outside the footprint of the lens. In this manner, images may be generated efficiently without excessive buffering and memory usage.

In some examples, the techniques and methods described herein may be implemented in software without any requirement for specialized hardware. In other examples, the techniques and methods described herein may be implemented utilizing specialized display components. For example, the frame of reference may be offset by rotating a pattern of sampling positions that correspond to a pattern of display elements to a rotated frame of reference, which may achieve results similar to rotating the frame of reference via a software graphics pipeline. The techniques described herein are also applicable in a wide variety of other graphics pipelines and image generation techniques, such as raytracing.

Figure 13:
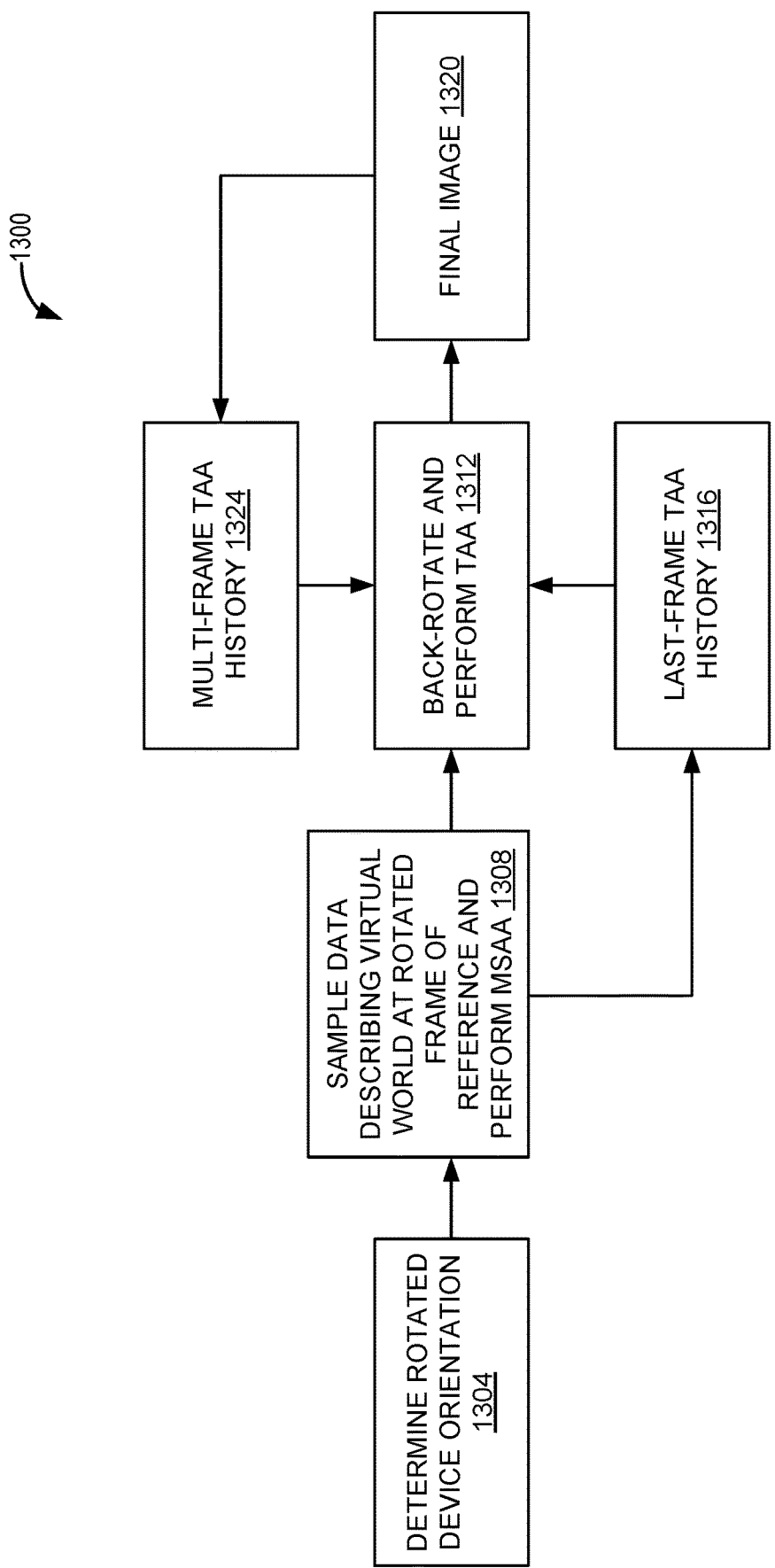
FIG. 13 is a flow chart of an example method for displaying an image via a display device using a rotated frame of reference with multi-sample anti-aliasing (MSAA) and temporal anti-aliasing (TAA) according to examples of the present disclosure.

In some examples and to further reduce aliasing artifacts, the techniques and methods described herein may be implemented alongside other anti-aliasing processes. For example, FIG. 13 is a flow chart of an example image synthesis algorithm 1300 for displaying an image via a display device using a rotated frame of reference along with MSAA and TAA techniques. At 1304, the algorithm 1300 includes determining a rotated device orientation of the display device to modify an original frame of reference to a rotated frame of reference.

Next, at 1308, the algorithm 1300 includes sampling data describing the virtual world, e.g. the scene description, at the rotated frame of reference and performing MSAA to produce an intermediate image frame. In some examples, MSAA is performed in a same pass as producing the intermediate image frame. In this manner, integrating MSAA with the generation of the intermediate image frame may additionally contribute to reducing aliasing without the computational expense of super-sampling or performing additional passes on each image frame.

To generate the final image frame, at 1312, the algorithm 1300 includes back-rotating the intermediate image frame to the original frame of reference and performing TAA. In this example, integrating TAA with the back-rotation process in the same pass may further increase efficiency. For example, at 1316, the algorithm 1300 includes receiving TAA history of a last image frame that was generated. In this manner, information from the last image frame may be used to stabilize a current image frame being generated at step at 1312.

Step 1312 may additionally or alternatively include performing multi-frame TAA, in which a running average of back-rotated images is computed and used to stabilize the current image frame. For example, at 1320, the algorithm 1300 includes outputting a final image frame for display via the display device. At 1324, each final image generated at 1320 may be used to create a multi-frame TAA history, which may be used to stabilize the current image frame being generated at step 1312.

Figure 14A:
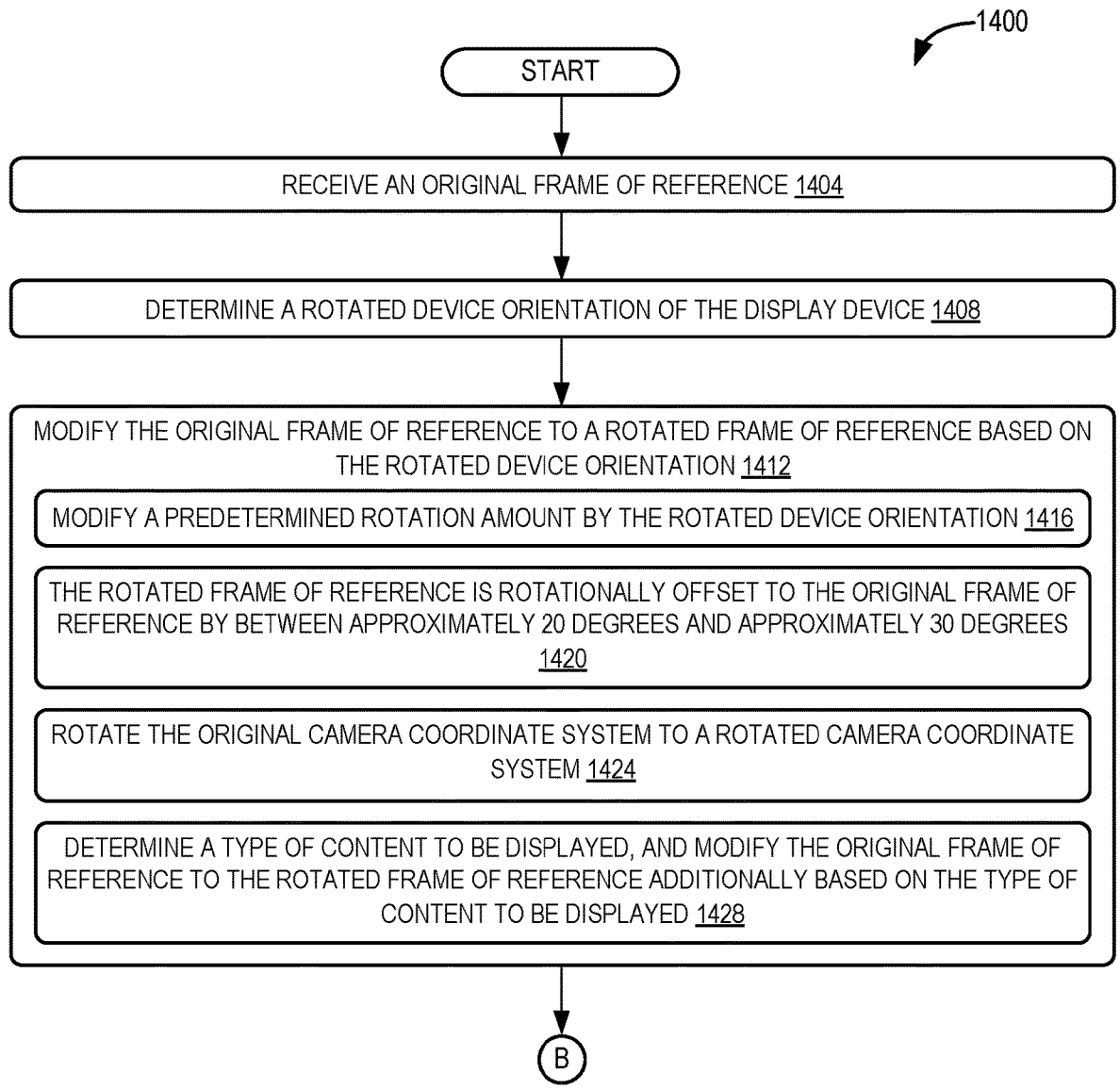
FIGS. 14A and 14B are a flow chart of an example method for displaying an image via a display device according to examples of the present disclosure.
Figure 14B:
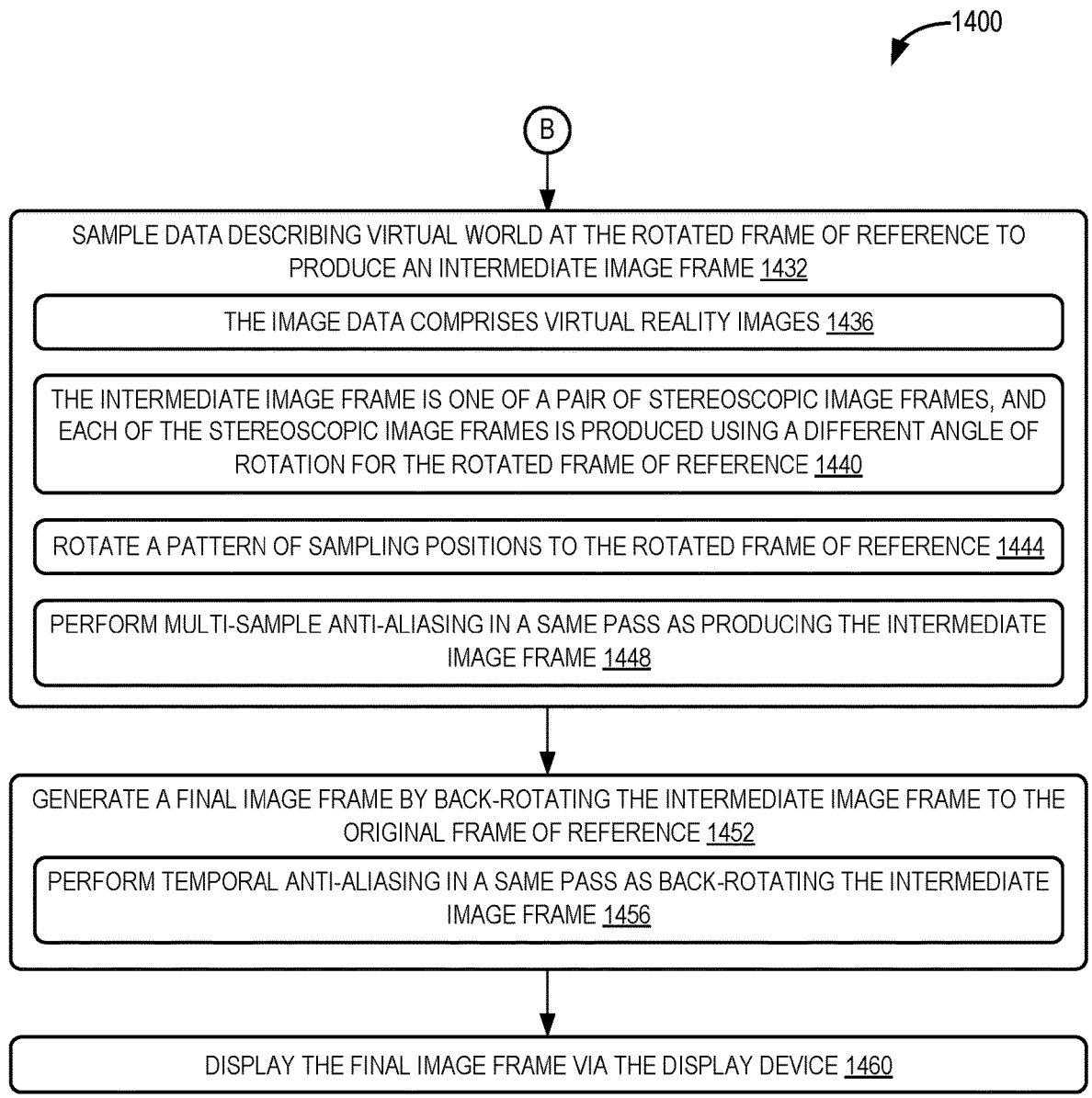

With reference now to FIGS. 14A-14B, a flow chart is illustrated of an example method 1400 for displaying an image via a display device. The following description of method 1400 is provided with reference to the software and hardware components described herein and shown in FIGS. 1-13 and 15. It will be appreciated that method 1400 also may be performed in other contexts using other suitable hardware and software components.

With reference to FIG. 14A, at 1404, the method 1400 may include receiving an original frame of reference. At 1408, the method 1400 may include determining a rotated device orientation of the display device. At 1412, the method 1400 may include modifying the original frame of reference to a rotated frame of reference based on the rotated device orientation. At 1416, the method 1400 may include, wherein modifying the original frame of reference to the rotated frame of reference comprises modifying a predetermined rotation amount by the rotated device orientation.

At 1420, the method 1400 may include, wherein the rotated frame of reference is rotationally offset to the original frame of reference by between approximately 20 degrees and approximately 30 degrees. At 1424, the method 1400 may include, wherein the original frame of reference comprises an original camera coordinate system, and wherein modifying the original frame of reference to the rotated frame of reference comprises rotating the original camera coordinate system to a rotated camera coordinate system. At 1428, the method 1400 may include determining a type of content to be displayed, and wherein modifying the original frame of reference to the rotated frame of reference is additionally based on the type of content to be displayed.

With reference to FIG. 14B, at 1432, the method 1400 may include sampling data describing a virtual world at the rotated frame of reference to produce an intermediate image frame. At 1436, the method 1400 may include, wherein the image data comprises virtual reality images. At 1440, the method 1400 may include, wherein the intermediate image frame is one stereoscopic image frame of a pair of stereoscopic image frames produced according to the method of claim 1, and wherein each of the stereoscopic image frames is produced using a different angle of rotation for the rotated frame of reference.

At 1444, the method 1400 may include, wherein sampling the data describing a virtual world at the rotated frame of reference comprises rotating a pattern of sampling positions to the rotated frame of reference. At 1448, the method 1400 may include performing multi-sample anti-aliasing in a same pass as producing the intermediate image frame.

At 1452, the method 1400 may include generating a final image frame by back-rotating the intermediate image frame to the original frame of reference. At 1456, the method 1400 may include performing temporal anti-aliasing in a same pass as back-rotating the intermediate image frame. At 1460, the method 1400 may include displaying the final image frame via the display device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 15:
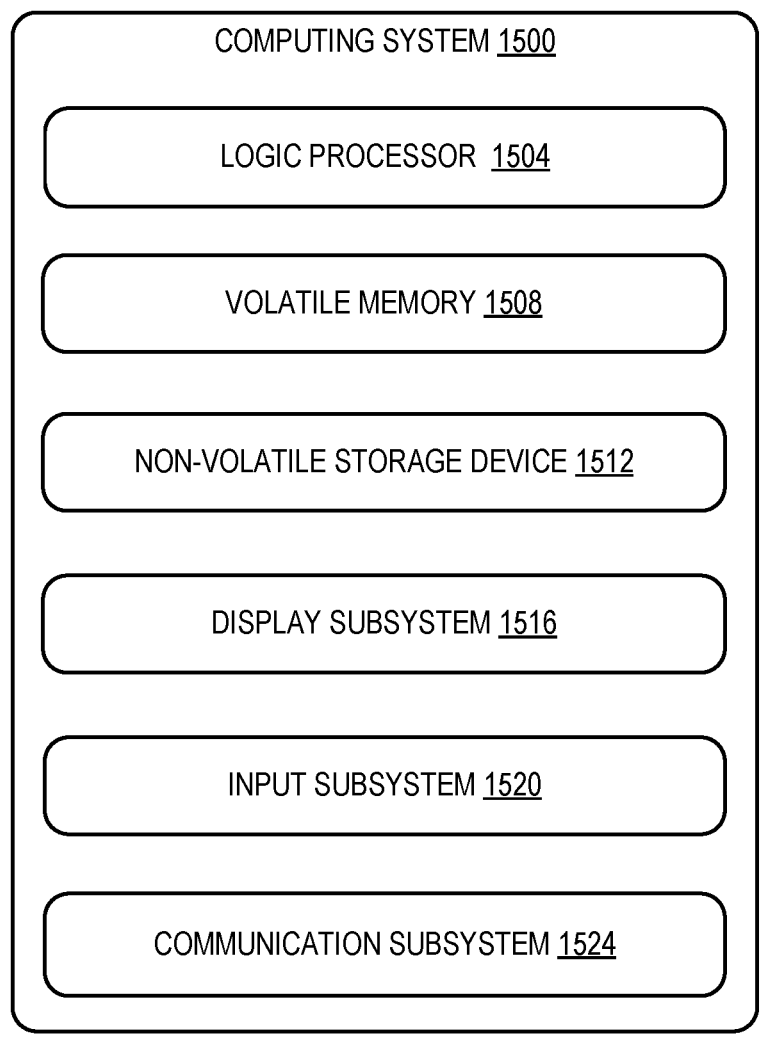
FIG. 15 shows a block diagram of a computing system according to examples of the present disclosure.

FIG. 15 schematically shows a non-limiting embodiment of a computing system 1500 that can enact one or more of the methods and processes described above. Computing system 1500 is shown in simplified form. Computing system 1500 may take the form of one or more gaming consoles, personal computers, server computers, tablet computers, home-entertainment computers, network computing devices, gaming devices, mobile computing devices, mobile communication devices (e.g., smart phones), and/or other computing devices, including wearable computing devices such as smart wristwatches and head mounted display devices. In the above examples, computing device 704, HMD devices 804A and 804B, and/or HMD device 908 may comprise computing system 1500 or one or more aspects of computing system 1500.

Computing system 1500 includes a logic processor 1504, volatile memory 1508, and a non-volatile storage device 1512. Computing system 1500 may optionally include a display subsystem 1516, input subsystem 1520, communication subsystem 1524 and/or other components not shown in FIG. 15.

Logic processor 1504 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1504 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1504 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 1508 may include physical devices that include random access memory. Volatile memory 1508 is typically utilized by logic processor 1504 to temporarily store information during processing of software instructions. It will be appreciated that volatile memory 1508 typically does not continue to store instructions when power is cut to the volatile memory 1508.

Non-volatile storage device 1512 includes one or more physical devices configured to hold instructions executable by the logic processors to implement the methods and processes described herein. When such methods and processes are implemented, the state of non-volatile storage device 1512 may be transformed—e.g., to hold different data.

Non-volatile storage device 1512 may include physical devices that are removable and/or built-in. Non-volatile storage device 1512 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1512 may include nonvolatile, dynamic, static, read/write, read-only, sequential-access, location-addressable, file-addressable, and/or content-addressable devices. It will be appreciated that non-volatile storage device 1512 is configured to hold instructions even when power is cut to the non-volatile storage device 1512.

Aspects of logic processor 1504, volatile memory 1508, and non-volatile storage device 1512 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 1500 typically implemented in software by a processor to perform a particular function using portions of volatile memory, which function involves transformative processing that specially configures the processor to perform the function. Thus, a program or application may be instantiated via logic processor 1504 executing instructions held by non-volatile storage device 1512, using portions of volatile memory 1508. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1516 may be used to present a visual representation of data held by non-volatile storage device 1512. As the herein described methods and processes change the data held by the non-volatile storage device, and thus transform the state of the non-volatile storage device, the state of display subsystem 1516 may likewise be transformed to visually represent changes in the underlying data. Display subsystem 1516 may include one or more display devices utilizing virtually any type of technology. Such display devices may be combined with logic processor 1504, volatile memory 1508, and/or non-volatile storage device 1512 in a shared enclosure, or such display devices may be peripheral display devices.

When included, input subsystem 1520 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1524 may be configured to communicatively couple various computing devices described herein with each other, and with other devices. Communication subsystem 1524 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1500 to send and/or receive messages to and/or from other devices via a network such as the Internet.

The following paragraphs provide additional support for the claims of the subject application. One aspect provides a method for displaying an image via a display device, the method comprising: receiving an original frame of reference; determining a rotated device orientation of the display device; modifying the original frame of reference to a rotated frame of reference based on the rotated device orientation; sampling data describing a virtual world at the rotated frame of reference to produce an intermediate image frame; generating a final image frame by back-rotating the intermediate image frame to the original frame of reference; and displaying the final image frame via the display device. The method may additionally or alternatively include, wherein modifying the original frame of reference to the rotated frame of reference comprises modifying a predetermined rotation amount by the rotated device orientation.

The method may additionally or alternatively include, wherein the rotated frame of reference is rotationally offset to the original frame of reference by between approximately 20 degrees and approximately 30 degrees. The method may additionally or alternatively include, wherein the original frame of reference comprises an original camera coordinate system, and wherein modifying the original frame of reference to the rotated frame of reference comprises rotating the original camera coordinate system to a rotated camera coordinate system. The method may additionally or alternatively include, wherein the final image frame comprises a virtual reality image. The method may additionally or alternatively include determining a type of content to be displayed, and wherein modifying the original frame of reference to the rotated frame of reference is additionally based on the type of content to be displayed.

The method may additionally or alternatively include, wherein the intermediate image frame is one of a pair of stereoscopic image frames produced according to the method of claim 1, and wherein each stereoscopic image frame of the stereoscopic image frames is produced using a different angle of rotation for the rotated frame of reference. The method may additionally or alternatively include, wherein sampling the data describing a virtual world at the rotated frame of reference comprises rotating a pattern of sampling positions to the rotated frame of reference. The method may additionally or alternatively include performing multi-sample anti-aliasing in a same pass as producing the intermediate image frame. The method may additionally or alternatively include performing temporal anti-aliasing in a same pass as back-rotating the intermediate image frame.

Another aspect provides a computing device, comprising: a processor; and a memory storing instructions executable by the processor to: receive an original frame of reference; determine a rotated device orientation of a display device; modify the original frame of reference to a rotated frame of reference based on the rotated device orientation; sample data describing a virtual world at the rotated frame of reference to produce an intermediate image frame; generate a final image frame by back-rotating the intermediate image frame to the original frame of reference; and display the final image frame via the display device. The computing device may additionally or alternatively include, wherein modifying the original frame of reference to the rotated frame of reference comprises modifying a predetermined rotation amount by the rotated device orientation. The computing device may additionally or alternatively include, wherein the original frame of reference comprises an original camera coordinate system, and wherein modifying the original frame of reference to the rotated frame of reference comprises rotating the original camera coordinate system to a rotated camera coordinate system.

The computing device may additionally or alternatively include, wherein the instructions are further executable to determine a type of content to be displayed, and wherein modifying the original frame of reference to the rotated frame of reference is additionally based on the type of content to be displayed. The computing device may additionally or alternatively include, wherein the intermediate image frame is one of a pair of stereoscopic image frames produced according to the instructions of claim 11, and wherein each stereoscopic image frame of the stereoscopic image frames is produced using a different angle of rotation for the rotated frame of reference. The computing device may additionally or alternatively include, wherein sampling the data describing the virtual world at the rotated frame of reference comprises rotating a pattern of sampling positions to the rotated frame of reference.

Another aspect provides a head-mounted display (HMD) device, comprising: a display; a processor; and a memory storing instructions executable by the processor to: receive an original frame of reference; determine a rotated device orientation of the display; modify the original frame of reference to a rotated frame of reference based on the rotated device orientation; sample data describing a virtual world at the rotated frame of reference to produce an intermediate image frame; generate a final image frame by back-rotating the intermediate image frame to the original frame of reference; and display the final image frame via the display. The HMD device may additionally or alternatively include, wherein modifying the original frame of reference to the rotated frame of reference comprises modifying a predetermined rotation amount by the rotated device orientation.

The HMD device may additionally or alternatively include, wherein the original frame of reference comprises an original camera coordinate system, and wherein modifying the original frame of reference to the rotated frame of reference comprises rotating the original camera coordinate system to a rotated camera coordinate system. The HMD device may additionally or alternatively include, wherein the instructions are further executable to determine a type of content to be displayed, and wherein modifying the original frame of reference to the rotated frame of reference is additionally based on the type of content to be displayed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for displaying an image via a display device to reduce or eliminate visual artifacts, the method comprising:
  receiving an original frame of reference;
  using signals from one or more sensors to determine a rotated device orientation of the display device relative to a physical environment, the rotated device orientation different from the original frame of reference;
  modifying the original frame of reference to a rotated frame of reference that is determined by (1) the rotated device orientation and (2) another rotation amount;
  sampling data describing a virtual world at the rotated frame of reference to produce an intermediate image frame;
  generating a final image frame by back-rotating the intermediate image frame to the original frame of reference; and
  displaying the final image frame via the display device.

2. The method of claim 1, wherein the another rotation amount is a predetermined rotation amount, and modifying the original frame of reference to the rotated frame of reference comprises modifying the predetermined rotation amount by the rotated device orientation.

3. The method of claim 1, wherein the rotated frame of reference is rotationally offset to the original frame of reference by between approximately 20 degrees and approximately 30 degrees.

4. The method of claim 1, wherein the original frame of reference comprises an original camera coordinate system, and wherein modifying the original frame of reference to the rotated frame of reference comprises rotating the original camera coordinate system to a rotated camera coordinate system.

5. The method of claim 1, wherein the final image frame comprises a virtual reality image.

6. The method of claim 1, further comprising determining a type of content to be displayed, and wherein modifying the original frame of reference to the rotated frame of reference is additionally based on the type of content to be displayed.

7. The method of claim 1, wherein the intermediate image frame is one of a pair of stereoscopic image frames produced according to the method of claim 1, and wherein each stereoscopic image frame of the stereoscopic image frames is produced using a different angle of rotation for the rotated frame of reference.

8. The method of claim 1, wherein sampling the data describing a virtual world at the rotated frame of reference comprises rotating a pattern of sampling positions to the rotated frame of reference.

9. The method of claim 1, further comprising performing multi-sample anti-aliasing in a same pass as producing the intermediate image frame.

10. The method of claim 1, further comprising performing temporal anti-aliasing in a same pass as back-rotating the intermediate image frame.

11. A computing device, comprising:
  a processor; and
  a memory storing instructions executable by the processor to reduce or eliminate visual artifacts, the instructions executable to:
    receive an original frame of reference;
    use signals from one or more sensors to determine a rotated device orientation of a display device relative to a physical environment, the rotated device orientation different from the original frame of reference;
    modify the original frame of reference to a rotated frame of reference that is determined by (1) the rotated device orientation and (2) another rotation amount;
    sample data describing a virtual world at the rotated frame of reference to produce an intermediate image frame;
    generate a final image frame by back-rotating the intermediate image frame to the original frame of reference; and
    display the final image frame via the display device.

12. The computing device of claim 11, wherein the another rotation amount is a predetermined rotation amount, and modifying the original frame of reference to the rotated frame of reference comprises modifying the predetermined rotation amount by the rotated device orientation.

13. The computing device of claim 11, wherein the original frame of reference comprises an original camera coordinate system, and wherein modifying the original frame of reference to the rotated frame of reference comprises rotating the original camera coordinate system to a rotated camera coordinate system.

14. The computing device of claim 11, wherein the instructions are further executable to determine a type of content to be displayed, and wherein modifying the original frame of reference to the rotated frame of reference is additionally based on the type of content to be displayed.

15. The computing device of claim 11, wherein the intermediate image frame is one of a pair of stereoscopic image frames produced according to the instructions of claim 11, and wherein each stereoscopic image frame of the stereoscopic image frames is produced using a different angle of rotation for the rotated frame of reference.

16. The computing device of claim 11, wherein sampling the data describing the virtual world at the rotated frame of reference comprises rotating a pattern of sampling positions to the rotated frame of reference.

17. A head-mounted display (HMD) device, comprising:
 a display;
 a processor; and
 a memory storing instructions executable by the processor to reduce or eliminate visual artifacts, the instructions executable to:
  receive an original frame of reference;
  use signals from one or more sensors to determine a rotated device orientation of the display relative to a physical environment, the rotated device orientation different from the original frame of reference;
  modify the original frame of reference to a rotated frame of reference that is determined by (1) the rotated device orientation and (2) another rotation amount;
  sample data describing a virtual world at the rotated frame of reference to produce an intermediate image frame;
  generate a final image frame by back-rotating the intermediate image frame to the original frame of reference; and
  display the final image frame via the display.

18. The HMD device of claim 17, wherein the another rotation amount is a predetermined rotation amount, and modifying the original frame of reference to the rotated frame of reference comprises modifying the predetermined rotation amount by the rotated device orientation.

19. The HMD device of claim 17, wherein the original frame of reference comprises an original camera coordinate system, and wherein modifying the original frame of reference to the rotated frame of reference comprises rotating the original camera coordinate system to a rotated camera coordinate system.

20. The HMD device of claim 17, wherein the instructions are further executable to determine a type of content to be displayed, and wherein modifying the original frame of reference to the rotated frame of reference is additionally based on the type of content to be displayed.

\* \* \* \* \*